United States Patent
Kovács et al.

(10) Patent No.: US 12,543,054 B2
(45) Date of Patent: Feb. 3, 2026

(54) SIGNALLING SUPPORT FOR SPLIT ML-ASSISTANCE BETWEEN NEXT GENERATION RANDOM ACCESS NETWORKS AND USER EQUIPMENT

(71) Applicant: NOKIA TECHNOLOGIES OY, Espoo (FI)

(72) Inventors: István Zsolt Kovács, Aalborg (DK); Teemu Mikael Veijalainen, Helsinki (FI); Wolfgang Zirwas, Munich (DE); Navin Hathiramani, Coppell, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 350 days.

(21) Appl. No.: 18/547,496

(22) PCT Filed: Feb. 23, 2021

(86) PCT No.: PCT/US2021/019198
§ 371 (c)(1),
(2) Date: Aug. 22, 2023

(87) PCT Pub. No.: WO2022/182330
PCT Pub. Date: Sep. 1, 2022

(65) Prior Publication Data
US 2024/0137783 A1    Apr. 25, 2024
US 2024/0236713 A9    Jul. 11, 2024

(51) Int. Cl.
*H04W 4/00*        (2018.01)
*H04W 24/02*       (2009.01)

(52) U.S. Cl.
CPC ................................ *H04W 24/02* (2013.01)

(58) Field of Classification Search
CPC ..... H04W 24/02; H04W 76/15; H04W 80/04; H04W 88/06; H04W 88/08; H04W 84/18; H04L 29/06
See application file for complete search history.

(56) References Cited

U.S. PATENT DOCUMENTS

| 11,139,911 B2 * | 10/2021 | Gao .................... H04L 1/0027 |
| 2013/0028192 A1 * | 1/2013 | Cheng .................. H04L 1/0073 370/328 |

(Continued)

FOREIGN PATENT DOCUMENTS

| WO | 2020160790 A1 | 8/2020 |
| WO | 2021063500 A1 | 4/2021 |

(Continued)

OTHER PUBLICATIONS

International Search Report and Written Opinion for International Application No. PCT/US2021/019198, mailed on May 4, 2021, 15 pages.

(Continued)

*Primary Examiner* — Phuongchau Ba Nguyen
(74) *Attorney, Agent, or Firm* — Barta Jones, PLLC

(57) ABSTRACT

An improved NR-U framework allows a gNB to repeat RLM-RS with the same index over each sub-band of an unlicensed spectrum. For example, a RLM-RS with the same indices are repeated by the gNB over the sub-bands of a wideband channel in an unlicensed spectrum. By monitoring the different sub-bands, a UE may find one or more sub-bands in which the RLM-RS having a particular index is successfully transmitted at a subsequent time.

20 Claims, 6 Drawing Sheets

(56) References Cited

U.S. PATENT DOCUMENTS

| | | |
|---|---|---|
| 2013/0051349 A1* | 2/2013 | Lv .................... H04L 1/0028 370/329 |
| 2013/0290223 A1 | 10/2013 | Chapelle et al. |
| 2017/0076195 A1 | 3/2017 | Yang et al. |
| 2019/0138934 A1 | 5/2019 | Prakash et al. |
| 2020/0195495 A1 | 6/2020 | Parker et al. |
| 2020/0374662 A1 | 11/2020 | Belghoul et al. |
| 2021/0045093 A1 | 2/2021 | Rao et al. |
| 2021/0185609 A1* | 6/2021 | Zhou ................ H04W 52/0206 |

FOREIGN PATENT DOCUMENTS

| | | |
|---|---|---|
| WO | 2021064275 A1 | 4/2021 |
| WO | 2021213685 A1 | 10/2021 |

OTHER PUBLICATIONS

"Unified architecture for machine learning in 5G and future networks", Focus group on Machine Learning for Future Networks including 5G (FG-ML5G), ITU-T Recommendation FG-ML5G-ARC5G, Jan. 2019, 32 pages.

"3rd Generation Partnership Project; Technical Specification Group Services and System Aspects; Study on traffic characteristics and performance requirements for AI/ML model transfer in 5GS (Release 18)", 3GPP TR 22.874, V0.0.0, Aug. 2020, pp. 1-10.

"3rd Generation Partnership Project; Technical Specification Group Radio Access Network; NR; Physical layer procedures for data (Release 16)", 3GPP TS 38.214 V16.4.0, Dec. 2020, pp. 1-169.

Extended European Search Report received for corresponding European Patent Application No. 21928284.5, dated Nov. 4, 2024, 12 pages.

Sun et al., "Proposal to update Y.ML-IMT2020-Use-Cases", C020-EM-2019/Q20, China Mobile, Aug. 5-7, 2019, 57 pages.

* cited by examiner

SIGNALLING SUPPORT FOR SPLIT ML-ASSISTANCE BETWEEN NEXT GENERATION RANDOM ACCESS NETWORKS AND USER EQUIPMENT

CROSS-REFERENCE TO RELATED APPLICATIONS

This application is a national stage entry of International Application No. PCT/US2021/019198, filed Feb. 23, 2021, entitled "SIGNALLING SUPPORT FOR SPLIT ML-ASSISTANCE BETWEEN NEXT GENERATION RANDOM ACCESS NETWORKS AND USER EQUIPMENT" which is hereby incorporated by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in an attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, within a wireless radio network, machine learning (ML)-split setup data representing a plurality of ML-split setups, an ML-split being a split of ML processing between the network node and that UE, each of the plurality of ML-split setups representing configuration options for a plurality of user equipments (UEs) being served by the network node so that the network node and each of the plurality of UEs may perform a radio resource management (RRM) function through a ML processing algorithm; transmitting, to each of the plurality of UEs being served by the network node, signalling data configured to trigger respective reconfigurations of each of the plurality of UEs for performing the ML-split with the network node, the signalling data including a representation of a respective subset of the plurality of ML-split setups, the respective subset of the plurality of ML-split setups being transmitted to that UE of the plurality of UEs based on a capability of that UE to perform ML processing for the RRM function.

According to an example implementation, an apparatus includes at least one processor and at least one memory including computer program code, the at least one memory and the computer program code configured to, with the at least one processor, cause the apparatus at least to receive, by a network node within a wireless radio network, machine learning (ML)-split setup data representing a plurality of ML-split setups, an ML-split being a split of ML processing between the network node and that UE, each of the plurality of ML-split setups representing configuration options for a plurality of user equipments (UEs) being served by the network node so that the network node and each of the plurality of UEs may perform a radio resource management (RRM) function through a ML-split; transmit, to each of the plurality of UEs being served by the network node, signalling data configured to trigger respective reconfigurations of each of the plurality of UEs for performing the ML-split with the network node, the signalling data including a representation of a respective subset of the plurality of ML-split setups, the respective subset of the plurality of ML-split setups being transmitted to that UE of the plurality of UEs based on a capability of that UE to perform ML processing for the RRM function.

According to an example implementation, an apparatus includes means for receiving, within a wireless radio network, machine learning (ML)-split setup data representing a plurality of ML-split setups, an ML-split being a split of ML processing between the network node and that UE, each of the plurality of ML-split setups representing configuration options for a plurality of user equipments (UEs) being served by the network node so that the network node and each of the plurality of UEs may perform a radio resource management (RRM) function through a ML-split; means for transmitting, to each of the plurality of UEs being served by the network node, signalling data configured to trigger respective reconfigurations of each of the plurality of UEs for performing the ML-split with the network node, the signalling data including a representation of a respective subset of the plurality of ML-split setups, the respective subset of the plurality of ML-split setups being transmitted to that UE of the plurality of UEs based on a capability of that UE to perform ML processing for the RRM function.

According to an example implementation, a computer program product includes a computer-readable storage medium and storing executable code that, when executed by at least one data processing apparatus, is configured to cause the at least one data processing apparatus to receive, by a network node within a wireless radio network, machine learning (ML)-split setup data representing a plurality of ML-split setups, an ML-split being a split of ML processing between the network node and that UE, each of the plurality of ML-split setups representing configuration options for a plurality of user equipments (UEs) being served by the network node so that the network node and each of the plurality of UEs may perform a radio resource management (RRM) function through a ML-split; transmit, to each of the plurality of UEs being served by the network node, signalling data configured to trigger respective reconfigurations of each of the plurality of UEs for performing the ML-split with the network node, the signalling data including a representation of a respective subset of the plurality of ML-split setups, the respective subset of the plurality of ML-split setups being transmitted to that UE of the plurality of UEs based on a capability of that UE to perform ML processing for the RRM function.

According to an example implementation, a method includes receiving, from a network node by a user equipment (UE) of a plurality of UEs being served by the network node, signalling data configured to trigger a reconfiguration of the UE for performing the ML-split with the network node, the signalling data including a representation of a respective subset of a plurality of ML-split setups received by the network node, the respective subset of the plurality of ML-split setups being based on a capability of the UE to perform ML processing for a radio resource management (RRM) function; transmitting, to the network node, status data representing a status of the UE to perform the ML processing for the RRM function; receiving, from the network node, activation data representing instructions to the UE to activate a ML-split setup of the subset of the plurality of ML-split setups; and after receiving the activation data, performing the ML-split with the network node for performing the RRM function using a ML model evaluated jointly between the network node and the UE.

According to an example implementation, an apparatus includes at least one processor and at least one memory including computer program code, the at least one memory and the computer program code configured to, with the at least one processor, cause the apparatus at least to receive, from a network node by a user equipment (UE) of a plurality of UEs being served by the network node, signalling data configured to trigger a reconfiguration of the UE for performing the ML-split with the network node, the signalling data including a representation of a respective subset of a plurality of ML-split setups received by the network node, the respective subset of the plurality of ML-split setups being based on a capability of the UE to perform ML processing for a radio resource management (RRM) function; transmit, to the network node, status data representing a status of the UE to perform the ML processing for the RRM function; receive, from the network node, activation data representing instructions to the UE to activate a ML-split setup of the subset of the plurality of ML-split setups; after receiving the activation data, perform the ML-split with the network node for performing the RRM function using a ML model evaluated jointly between the network node and the UE.

According to an example implementation, an apparatus includes means for receiving, from a network node by a user equipment (UE) of a plurality of UEs being served by the network node, signalling data configured to trigger a reconfiguration of the UE for performing the ML-split with the network node, the signalling data including a representation of a respective subset of a plurality of ML-split setups received by the network node, the respective subset of the plurality of ML-split setups being based on a capability of the UE to perform ML processing for a radio resource management (RRM) function; means for transmitting, to the network node, status data representing a status of the UE to perform the ML processing for the RRM function; means for receiving, from the network node, activation data representing instructions to the UE to activate a ML-split setup of the subset of the plurality of ML-split setups; and means for, after receiving the activation data, performing the ML-split with the network node for performing the RRM function using a ML model processed jointly between the network node and the UE.

According to an example implementation, a computer program product includes a computer-readable storage medium and storing executable code that, when executed by at least one data processing apparatus, is configured to cause the at least one data processing apparatus to receive, from a network node by a user equipment (UE) of a plurality of UEs being served by the network node, signalling data configured to trigger a reconfiguration of the UE for performing the ML-split with the network node, the signalling data including a representation of a respective subset of a plurality of ML-split setups received by the network node, the respective subset of the plurality of ML-split setups being based on a capability of the UE to perform ML processing for a radio resource management (RRM) function; transmit, to the network node, status data representing a status of the UE to perform the ML processing for the RRM function; receive, from the network node, activation data representing instructions to the UE to activate a ML-split setup of the subset of the plurality of ML-split setups; after receiving the activation data, perform the ML-split with the network node for performing the RRM function using a ML model evaluated jointly between the network node and the UE.

The details of one or more examples of implementations are set forth in the accompanying drawings and the description below. Other features will be apparent from the description and drawings, and from the claims.

DETAILED DESCRIPTION

Figure 1:
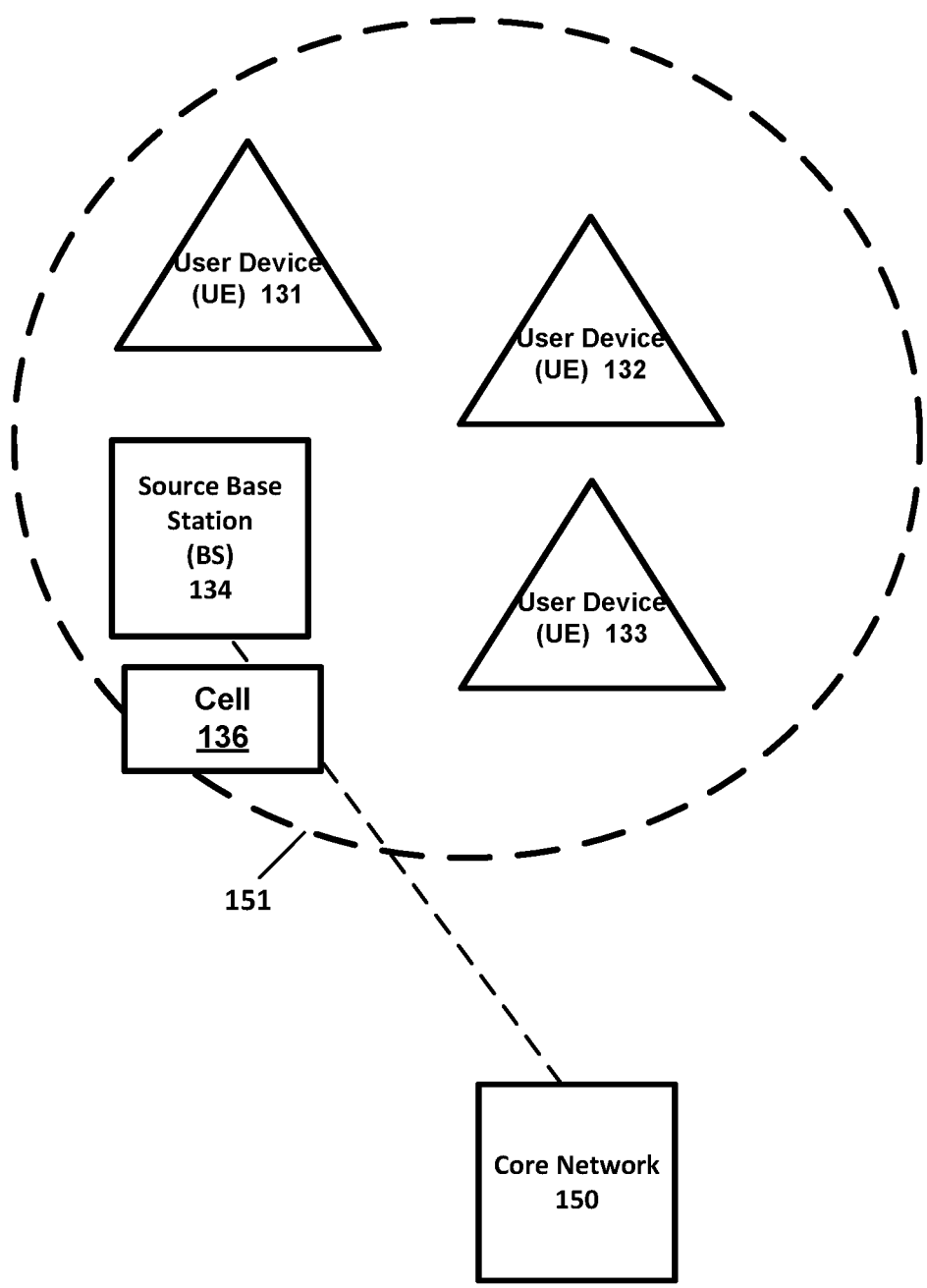
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) also may be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Enabling, orchestrating and distributing machine learning (ML)-assisted functionalities across next generation random-access network (NG-RAN) and 5G core (5GC) entities is addressed in ongoing work, internally in Nokia, 3GPP RAN3, ITU-T and O-RAN. Future NR release (e.g., 18 and beyond) work is very likely to have study items on ML-enabled radio resource management (RRM) functionalities, including the ML-assistance in the user equipment (UE).

Traditionally ML techniques have been used in radio network management, fault detection, failure monitoring, intrusion detection, etc. Recently, there have been many proposals in the open literature on how to use ML techniques to implement and/or optimise RAN functions—specifically PHY, MAC and RRM functions such as, e.g., channel encoding/decoding, channel estimation/prediction, resource allocation/scheduling, mobility optimization).

In general, the common proposal of these studies is to 'replace traditional rule-based techniques with ML-based techniques' in order to achieve system gains either in terms of radio capacity (increased spectral efficiency or signalling reduction) and reliability, or complexity reduction.

A conventional approach to UE ML-based assistance involves the UE implementing an ML host (training and/or inference). For non-radio access purposes such assistance may occur in smartphones, e.g., to optimize the keyboard functionalities, voice assistants, etc. It may be intended at some point for RAN-related ML-based algorithms to be run on the UE side too. Currently, completely replacing traditional rule-based RRM methods with ML-based is active research for future generation communication systems.

Another conventional approach, with potential for short-term implementation and 3GPP standardization, is to use ML-based assistance within traditional RRM methods, and where traditional rule-based techniques are the fallback option. This may allow the UE to take more decisions autonomously and provide more accurate and/or timely requests to the RAN. This also means that the traditional control and feedback signalling loops between the RAN and the UE might need to be adapted to the envisioned operating conditions of ML-based algorithms running in the RAN and/or UE.

Nevertheless, the distribution of an ML-assistance between NG-RAN nodes and UEs is a complicated task compared to the distribution of ML-assisted functionalities across NG-RAN nodes only. Reasons for such complication include the following:

1) Different UEs will have different ML processing capabilities. In some cases, complete ML models may be run in a first set of UEs while only simple inference tasks may be run in a second set of UEs.
2) Different RAN nodes may have different ML processing capabilities. Even gNB may have limited processing power and the available computation power for executing complex ML tasks might even fluctuate due to system load, etc.
3) Some ML-assistance mechanisms would greatly benefit from UEs participating in the ML operations, such as in the case of classical federated learning schemes. For specific RRM purposes, however, this requires a high degree of coordination among the NG-RAN and the UEs.

In this context "ML-assistance" for RRM indicates that a RRM functionality relies on ML implementation partially or entirely. Accordingly, a combination of ML-based and rule-based mechanisms are generally assumed to perform the RRM function. It is assumed that the overall ML-assistance mechanism for given RRM function supports splitting between processing steps running in gNB and UEs. This is referred to as 'ML-split' although the entire ML-assistance functionality is being split.

In contrast to the above-described conventional approaches to UE ML-based assistance, improved techniques of providing ML-assistance include distributing sets of ML-split setups to groups of network nodes and UEs, each network node selecting a subset of ML-split setups to associated UEs based on respective configurations of the associated UEs. The 'ML-split setups' include trained ML instances for certain RRM functions to be executed in distributed manner between the gNB and UE, i.e., when the gNB and UE run different parts of the same ML-assistance mechanism. Such 'ML-split setups' and the associated hierarchical RRC/MAC protocol are controlled by a core network entity which is in charge of general ML related orchestration, such as NWDAF in 3GPP, or 'Service Management' in O-RAN, and the corresponding interfaces to the NG-RAN are available. For the purpose of this invention, it is assumed that there is an entity in the core network or in the NG-RAN which implements the required functionalities, e.g., an 'ML-split orchestrator' (MSO).

The above-described improved techniques provide a distribution framework of ML-assistance between network nodes and UEs having different computational capabilities. This distribution framework is agnostic to the type of ML algorithm and architecture employed in the ML-assistance (e.g., recurrent neural network, convolutional neural network, etc.). An example showing a deep neural network is shown in FIG. 2.

Figure 2:
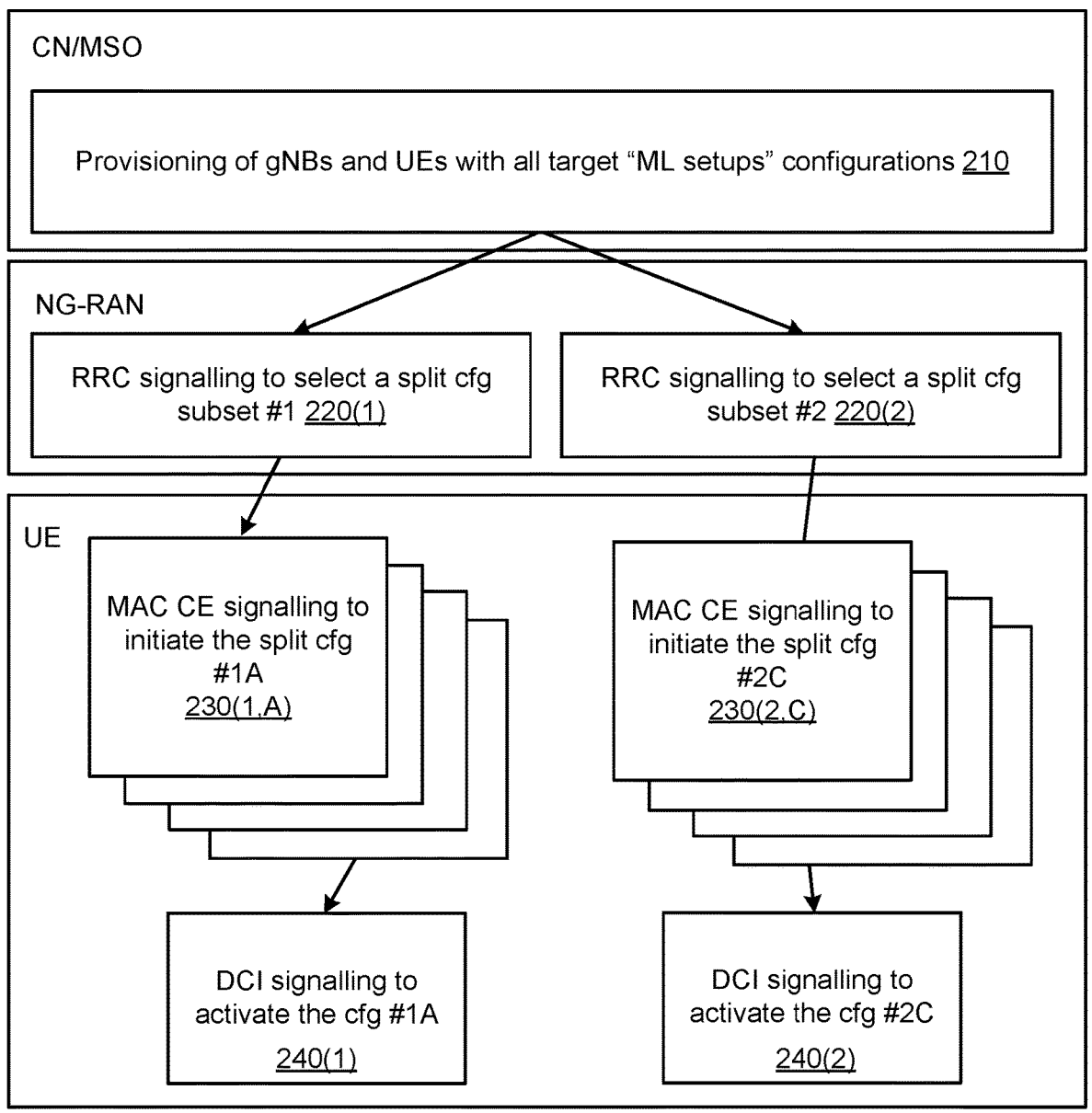
FIG. 2 is a diagram illustrating a hierarchal radio resource control (RRC)/media access control (MAC) protocol and signalling flow to support a distributed machine learning (ML) functionality between next generation radio access network (NG-RAN) and user equipment (UE), according to an example implementation.

FIG. 2 is a diagram illustrating a hierarchal radio resource control (RRC)/media access control (MAC) protocol and signalling flow 200 to support a distributed machine learning (ML) functionality between next generation radio access network (NG-RAN) and user equipment (UE). The flow 200 is included in a hierarchical RRC/MAC protocol and signalling flow, which supports low-overhead and fast reconfiguration of distributed ML architectures. While all 'layers' including the capability to signal, from the MSO to the NG-RAN and UE, the set of possible ML-split configurations, are shown in FIG. 2. The focus of the improved distribution framework is on the 'lower' layer blocks where RRC and MAC signalling is used.

The main signalling interfaces shown in FIG. 2 are as follows.

Signalling from CN/MSO to provision 210 the gNBs and UEs with sets of ML-split configuration options ('ML-split setups').
- The scope of the 'ML-split setup' can be limited by the network and could, for example, be limited to one or a combination of the following: Tracking Area (TA), frequency layer, beam, geographical area, etc.
- Such signalling needs to carry the 'ML-split setup' and accordingly is more appropriate to use user (U)-plane for the UE. Additionally, employing the U-plane allows further flexibility in the network architecture when 'ML-split setups' need to be provided with reduced latency. This can be, for example, accomplished via distributed user plane functions (UPFs) located close to the RAN network.
- In some implementations, this signalling from MSO to the UEs can also include the expected trigger signals to be used later by the gNB in RRC and/or MAC signalling, to configure and activate a specific 'ML-split setup.'
  - One idea involves providing to the UE a definition of the trigger messages which may be used by the gNB to initiate and activate the ML-split. Such a definition could also be provided via RRC, without overloading the RRC. In some implementations, the MSO has more information available to orchestrate this provision.

New RRC signalling 220(1), 220(2) to trigger a subset of ML reconfigurations in the UEs which have been provisioned by the MSO.
- These reconfigurations are gNB specific and may be based on RRM parameters such as UE radio beam configurations, serving cells, QoS profile, etc.
- These reconfigurations may provide the UE for ML-assistance activation triggers based on events.
- The reconfigurations may also include an associated priority for each ML assisted RRM functionality requested by the network. The UE may use this information to prioritize ML assistance when it experiences a shortage of resources or overheating, for example.

New MAC CE 230(1,A), 230(2 C) to trigger a specific ML-split configuration and/or activation in UE within the limits selected using previous RRC signalling.
- This is UE, or UE group, specific based on UE capabilities, etc.
- The MAC activation CE may distinguish two different modes:
  - Semi-persistent: UE ML-assistance is provided as per an established periodicity during the duration of the activation periods.
  - Persistent: Network assumes the UE ML assistance is constantly employed during the activation periods.

New DCI 240(1), 240(2) to be used for the activation of a specific ML-split configuration in UE within the limits selected using previous RRC signalling.
- The new DCI could trigger the ML assistance for the following:
  - Aperiodic: NW request for ML assistance for specific instance.
  - Semi-persistent: UE ML assistance is provided as per an established periodicity during the duration of the activation periods.
  - Persistent: Network assumes the UE ML assistance is constantly employed during the activation periods.

An example 'ML-split setup' includes at least the following elements:
- The associated RRM functionality which is assisted by the ML-split instance (split between gNB(s) and UEs) for a given geographical network area or tracking area,
- The required parameters for the trained ML-assistance model includes the following:
  Usual ML parameters, and
  some implementations, RRM parameters.
- The allowed set of ML model splits reconfiguration options between gNB and UE or between selected UE,
  Generally, ML architectures such as encoder-decoder, transfer learning, or federated learning are suitable for ML split configurations.
  Combination of reinforcement learning models running in gNB and UE.
  Specific ML splitting options like automatic sub splitting, i.e., one UE splits its ML instance over close by other UEs depending on their availability and these UEs do the same with their close by neighbors (federated learning, which might include in some cases thousands of UEs).
  Specific ML splitting indicating partly rule-based PHY or MAC layer functionalities, thereby replacing only parts of the ML-assistance model.
- The definitions of the corresponding signalling elements for each split option (RRC and MAC/DCI),
- The selection criteria between the different allowed ML model splits. For example:
  UE capabilities: advertised capabilities, D2D/V2x capabilities, etc.,
  Current cell load, # of MU MIMO UEs, CoMP versus 'per cell' scheduling,
  Beam management options (gNB and UE),
  Location of the gNB ML instance (edge, cloud, CU/DU).
- ML deactivation conditions.

In some implementations, an 'ML-split setup' can also include the following:
- Acceptable latencies, processing delays, test data, limitations per instance,
- Geo-location area of the target UEs (especially for V2X),
- UE group/proximity status (especially for V2X),
- Expected UE mobility pattern or mobility states.

The table below summarizes a definition of a ML-split setup.

TABLE 1

Definition of an example ML-split setup.

| Parameter | Definition/value/range | Comments |
|---|---|---|
| RRM functionality | UE Component Carrier (CC) CSI feedback selection (Other potential functionalities: UE MIMO mode selection UE UL power adjustments UE TX/RX antenna panel selection UE/gNB Beam management) | The target RRM functionality which is using partly or entirely one or more ML algorithm(s). The target RRM functionality needs to use information from both UE and gNB in order to 'qualify' for a potential ML-split configuration(s) Possible cases: The ML algorithm itself can be split, e.g., transfer learning architectures or federated learning The RRM functionality can be split, e.g., the rule-based procedures can be separated from the ML-based procedures The ML algorithm and the RRM functionality can be split (combination of the above) |
| ML training/learning type | On-line {Off-line, On-line} | Indicates the type of training/learning for the ML algorithm used in the target RRM functionality Off-line: indicates the use of pre-trained ML model(s) which need to be periodically refreshed On-line: indicated the use of ML models which can be retrained on-line (periodically) or use of reinforcement models (continuous self-training) |
| Inputs | gNB: [CCs (list of IDs), TX beam (ID), SRS (dBm), CSI per reported CC (list of reported CSI)] UE: [CCs (list of IDs), RX beam (ID), RX panel (ID), RX RSRP (dBm)] | Indicates the input metrics/parameters and their type for the ML-based RRM functionality, at the gNB (NG-RAN) side and the UE side. |
| Outputs | gNB: CC channel state estimation (CC CSI) UE: Selected CC CSI feedback (CSI for CCs) | Indicates the output metrics and their type for the ML-based RRM functionality, at the gNB (NG-RAN) side and the UE side. |
| Total number of candidate ML-split configurations | N (integer) | The total number of candidates (usable/available) ML-split configurations for the target RRM functionality |

TABLE 1-continued

Definition of an example ML-split setup.

| Parameter | Definition/value/range | Comments |
| --- | --- | --- |
| ML-split configuration #1 | | Depends on: The target RRM functionality implementation The baseline/common UE capabilities The actual UE capabilities and potential RRM limitations by the serving gNB When N > 1, then each setup is marked with an ID and only one of the ML-split configuration will be activated/used as determined by the serving gNB The details of this information depend on the type and implementation details of the ML-assistance for the target RRM functionality |
| ID | 1 (ID of the ML-split configuration) | ID number assigned to the ML-split configuration that follows, 1 . . . N |
| Split configuration: ML-inference node | UE {gNB, UE, gNB + UE} | Indicates where the ML inference process is to be run The 'gNB + UE' option indicates that the final inference results are based on partial inference from gNB and UE |
| Split configuration: UE ML-assisted output | Selected CC CSI feedback {None, list of Outputs} | Indicates the UE ML inference output; depends on the specified Outputs Conditioned by the selected ML-inference node |
| Split configuration: UE Rule-based output | None {None, list of Outputs} | Indicates the UE Rule-based inference output; depends on the specified Outputs Conditioned by the selected ML-inference node |
| Split configuration: gNB ML-assisted output | None {None, list of Outputs} | Indicates the gNB ML inference output; depends on the specified Outputs Conditioned by the selected ML-inference node |
| Split configuration: gNB Rule-based output | CC CSI {None, list of Outputs} | Indicates the gNB Rule-based inference output; depends on the specified Outputs Conditioned by the selected ML-inference node |

TABLE 1-continued

Definition of an example ML-split setup.

| Parameter | Definition/value/range | Comments |
| --- | --- | --- |
| Split configuration: ML-(re)training node | gNB<br>{gNB, UE} | Indicates where the ML training process is to be run |
| Reconfiguration request signalling | RRC<br>{RRC, None} | Indicates the type of signalling expected to carry the reconfiguration request information from the gNB to the UE 'None' indicates implicit reconfiguration, when only one ML-split is available |
| Reconfiguration confirmation signalling | RRC<br>{RRC, None} | Indicates the type of signalling expected to carry the reconfiguration confirmation information from the UE to the gNB |
| Activation condition | "Number of CC > 3" | Indicates what is the trigger conditions to activate the current ML-split e.g., this information can be configured in a similar way as mobility events and triggers |
| Activation signalling | MAC CE<br>{RRC, MAC CE, DCI}<br>Bit #3 == 1<br>{Available bits for ML related signalling} | Indicates the type of signalling expected to carry the activation information from the gNB to the UE This includes also the definition of the activation information, e.g., bit index, flag, values, etc. |
| Deactivation condition | "Number of CC <= 3" ‖ "gNB request" | Indicates what is the trigger conditions to deactivate the current ML-split e.g., this information can be configured in a similar way as mobility events and triggers The default "gNB request" is included as fall-back mode |
| Deactivation signalling | MAC CE<br>{RRC, MAC CE, DCI}<br>Bit #2 == 1<br>{Available bits for ML related signalling} | Indicates the type of signalling expected to carry the deactivation information from the gNB to the UE This includes also the definition of the deactivation information, e.g., bit index, flags, values, etc. |

One can motivate the splitting between gNB and UE by the different information available at UE and gNB, i.e., the UE might have more receive than transmit antenna panels. Therefore, only the UE is aware of which beams and/or panels receive with what power levels and how this varies over time. The gNB can use SRS to learn the radio channel and for frequency division duplex (FDD) this would mean to exploit partial reciprocity as well as channel state information (CSI) or beam related reporting.

If the UE has several component carriers configured, the UE could decide based on the ML which CSI information to report. The number of the uplink control, information (UCI) bits is limited to 115 bits as per 3GPP 38.214 and there are priority rules to decide which to report in case of UCI payload exceeding the limit. ML could be employed for UE to determine which CSI to include in a given occasion based on its traffic pattern and configuration.

Depending on the UE RF environment the receive power per panel might be relatively stable or, for example, at street crossings highly time variant. In that case it makes sense to activate a new ML model at the gNB and the UE when entering a crossing.

One can further integrate a rule-based part as we know that for channel estimation unitary Tensor ESPRIT works well with low number of multipath components per beam and in case of high SINR. For more challenging UE environments potentially including fluctuating interference from neighboring cells then we can benefit from ML inferences.

In some implementations, the possible ML-split configurations (406-407) include rule based PHY/MAC layer modules in combination with varying ML modules or layers. For example, for a first split option we have one ML module at the UE without PHY/MAC inference support and a second split option with PHY/MAC module support together with a correspondingly modified ML structure. Such PHY/MAC layer split options might then be possible at UE as well as at the gNB. The underlying motivation is that for the UE there exist a high number of rule-based algorithms with close to optimum performance, like for example, for decoding the iterative decoding of Turbo codes. Typically, then iterative decoding may be a good choice, but in case of low load less powerful but more power efficient ML inference might be a better choice. Or, in some implementations, faster ML based decoding may be preferable over iterative decoding with higher latency, for example, in case of a URLLC application.

Figure 3:
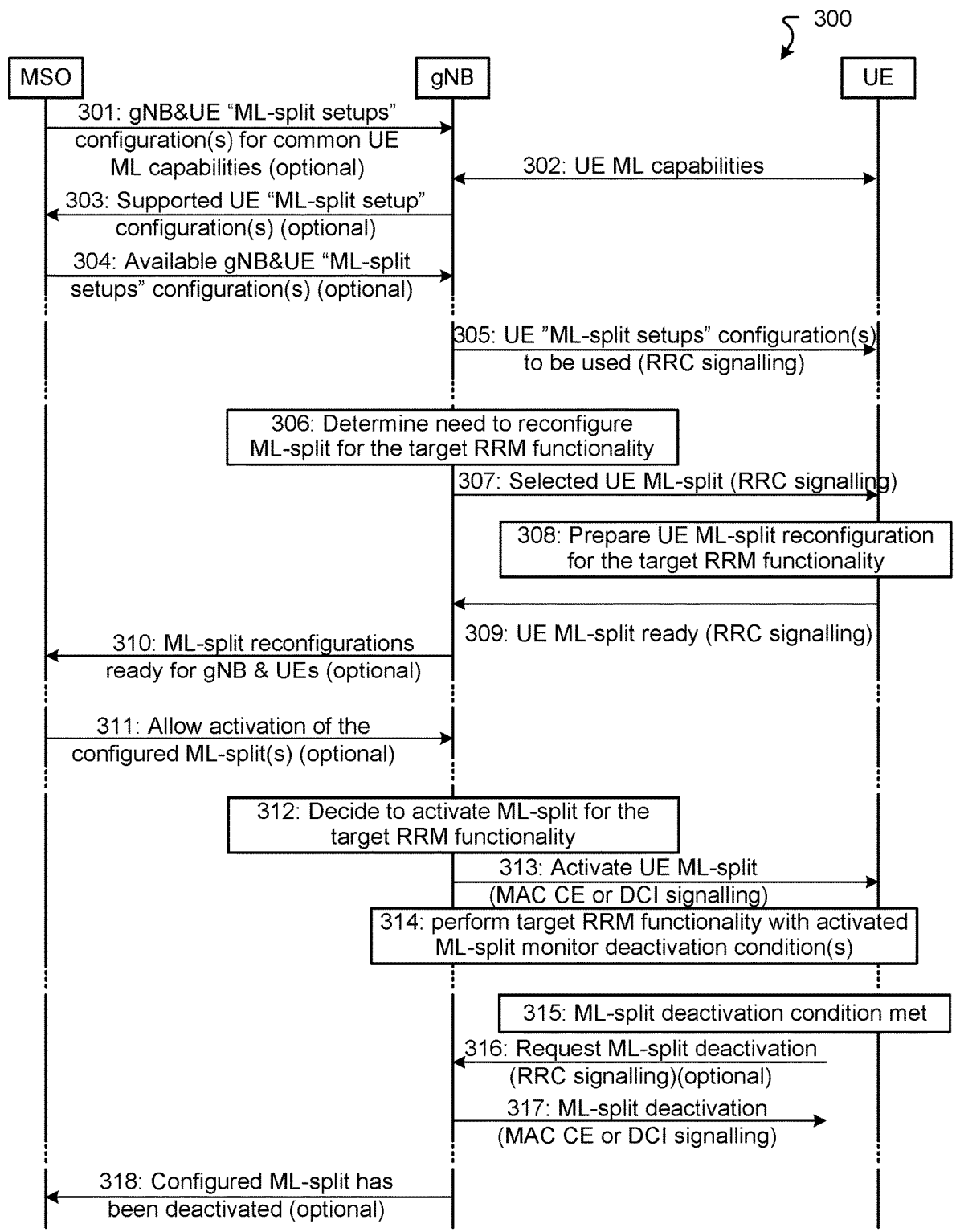
FIG. 3 is a sequence diagram illustrating the hierarchal signalling according to an example implementation.
Figure 4:
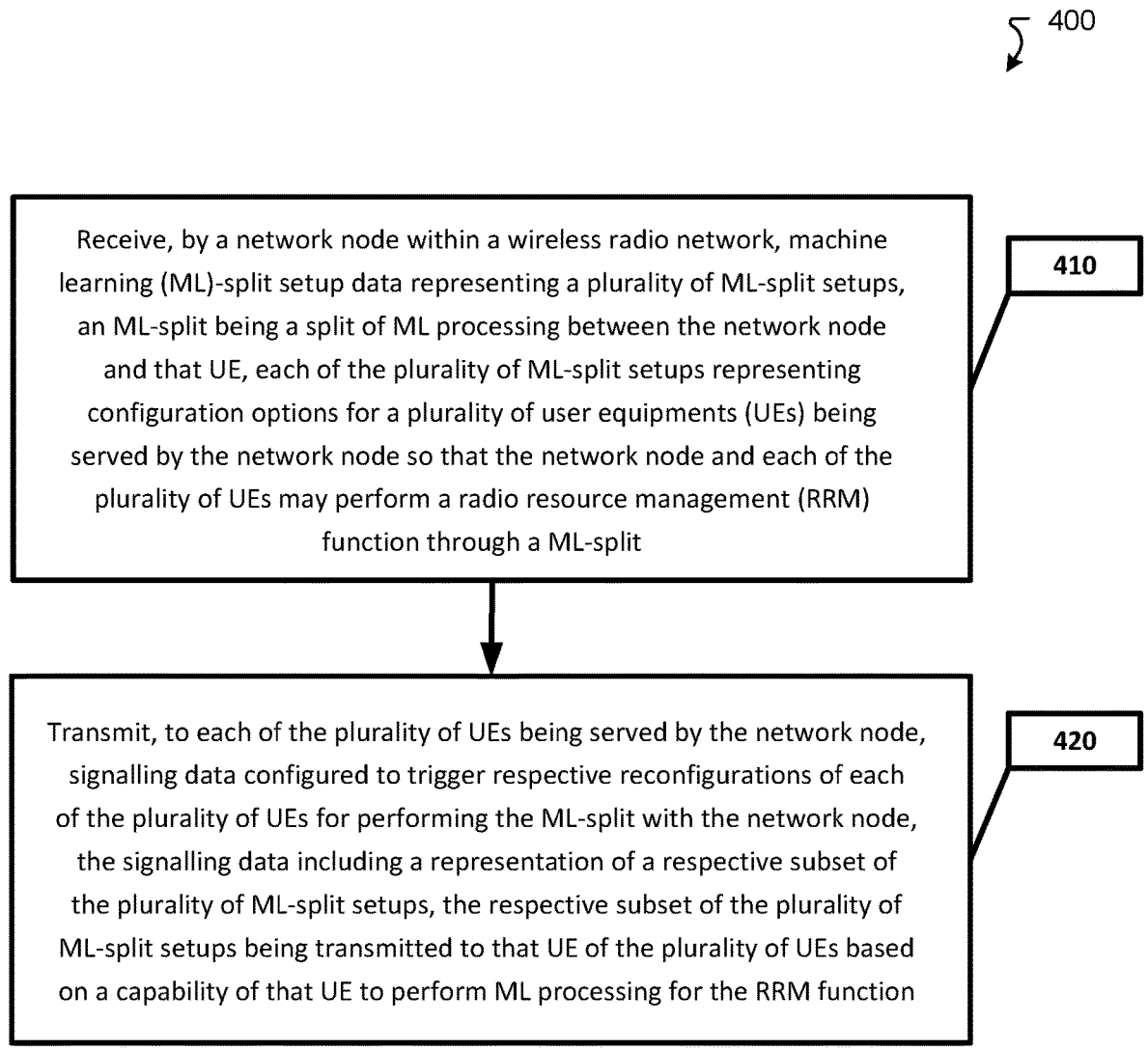
FIG. 4 is a flow chart illustrating a process of performing signalling support for ML-split assistance according to an example implementation.

FIG. 3 is a sequence diagram illustrating a hierarchal signalling flow 300. At 301, in some implementations, the MSO sends the gNB and UE ML-split setups configurations for common UE ML configurations. The MSO controls and select all ML functionalities to be used in the gNBs and UEs. The MSO also maintains set of ML-split setups. Due to the diverse UE ecosystem, e.g., the diverse capabilities of UEs in the ecosystem, in addition to maintaining ML-split setups per RRM function, a finer granularity may be required to ensure ML algorithms in the setup are prioritized as per network needs and UEs capabilities at the time of activation. The MSO then generates configuration content/information to the target gNBs and their UEs with all allowed ML-split configurations after coordination between MSO and the gNBs in a given network area.

At 302, the UE and gNB exchange ML capabilities for the UE.

At 303, in some implementations, the gNB sends supported UE ML-split setup configurations to the MSO.

At 304, in some implementations, the MSO sends available gNB and UE ML-split setups configurations to the gNB.

At 305, the gNB sends the UE ML-split setups configurations to be used to the UE via RRC signalling. That is, each targeted gNB generates RRC signalling content/information—with a subset of ML-split configurations for the selected UEs and the corresponding triggering mode (RRC, MAC, DCI).

At 306, the gNB determines whether to reconfigure the ML-split for the target RRM functionality.

At 307, the gNB sends the selected UE ML-split to the UE via RRC signalling.

At 308, the UE prepares UE ML-split reconfiguration for the target RRM functionality.

At 309, the UE sends an indication to the gNB that the ML-split is ready. That is, after the UEs are ML-configured or reconfigured via RRC, the ML reconfigured UEs feedback the status to the gNB via RRC. Possible actions in the UE after receiving the ML reconfiguration RRC message include the following:

- The ML layers can be used as provided by the MSO imply no additional ML training is required, and UE prepares/loads the model and provides positive feedback to MSO,
- Some ML layers may use retraining. This information can be included in the ML-split setup or determined as UE specific case-by-case imply UE provides positive feedback to gNB only after ML retraining has been finalized,
- In some implementations, other conditions such as UE power consumptions, expected traffic, etc. prevent the UE perform the reconfiguration imply UE provides negative feedback to gNB,
- In some implementations, the gNB generates feedback to the MSO including the status messages received from the UEs.

At 310, the gNB sends an indication to the MSO that the ML-split reconfigurations for the gNB and UE are ready.

At 311, in some implementations, MSO allows activation of the configured ML-split. That is, the MSO signals 'green light' for the use of the ML-split in the corresponding gNBs taking in consideration the received feedback from the UEs.

- The 'green light' can be implicit, and an alternative solutions is the MSO signalling only 'red light' to stop the use of certain ML-splits.
- This 'green light' indication from MSO does not prevent the corresponding gNBs to block the use of certain ML-split configurations as determined based on local conditions.
- The gNBs are not allowed to activate other ML setups which have not been 'approved' (orchestrated) by the MSO (this is also a general assumption in prior-art, O-RAN, or ITU-T).

At 312, the gNB determines whether to activate the ML-split for the target RRM functionality. That is, in some implementations, gNBs coordinates the timing for the activation of the new 'ML-split' configuration via RRC signalling.

- The use of the new ML-split is always gNB configured via RRC signalling (404) and activated via MAC/DCI or UE event triggered based on a RRC reconfiguration (407).
- The timing coordination might be needed especially in cases when the UE requires additional time to prepare for the activation of the new 'ML-split'.
- This coordination can be in the form of selection of certain system frame number by the gNB, and indication of this selection to the UEs, when a certain 'ML-split' is expected to be activated by the gNB via MAC or DCI.
- In some implementations, gNBs can configure 'ML-split' including partly rule-based, e.g., PHY or MAC layer functionalities, thereby replacing part of the ML-assistance model.

At 313, the gNB sends an activation command to the UE to activate the ML-split via MAC CE or DCI signalling. That is, the gNB activates the new configuration in the selected UEs using MAC CE or DCI signalling.

- The new reconfigured ML in the UE should only be activated in certain scenarios, as determined/configured by the gNB.

The MAC activation CE may distinguish two different modes:
- Semi-persistent: UE ML assistance is provided as per an established periodicity during the duration of the activation periods,
- Persistent: Network assumes the UE ML assistance is constantly employed during the activation periods.

The new DCI could trigger the ML assistance for the following:
- Aperiodic: NW request for ML assistance for specific instance,
- Semi-persistent: UE ML assistance is provided as per an established periodicity during the duration of the activation periods,
- Persistent: Network assumes the UE ML assistance is constantly employed during the activation periods.

Although gNB sends trigger to perform a specific reconfiguration, UE should not activate it (use it) until it meets certain conditions configured by the gNB.
- In some implementations, the gNB protects its KPIs and may configure UE to employ ML as long as RSRP of serving cell is greater than a specified threshold.

At 314, the gNB and the UE perform target RRM functionality with activated ML-split and monitor the deactivation condition. That is, the UEs and gNB run and/or perform the configured ML-based and RRM functionality; both UE and gNB monitor the ML deactivation condition as provided by the MSO.
- For example, the UEs checks periodically that the ML deactivation condition is met at the UE side and request deactivation from the gNB via RRC or MAC when the condition is met.
- The gNB check periodically the ML deactivation condition is met at the network side and signals deactivation to the UE.

At 315, the UE determines that the ML-split deactivation condition is met.

At 316, the UE sends the gNB a request to deactivate the ML-split via RRC signalling.

At 317, the gNB sends the UE a command to deactivate the ML-split via MAC CE or DCI signalling.

At 318, the gNB notifies the MSO that the configured ML-split has been deactivated. When there are no more UEs left with activated ML-split in given gNB, the gNB signals ML-split deactivation status to the MSO.
- The signalling of the deactivation status enables the MSO to have sufficiently update information on which RRM functionalities are being assisted by ML algorithms and in which parts of the radio network, e.g., to better assess impacts to KPIs.
- In some implementations, the signalling provides the MSO updated information on the number of active UEs supporting a certain ML inference.

Figure 5:
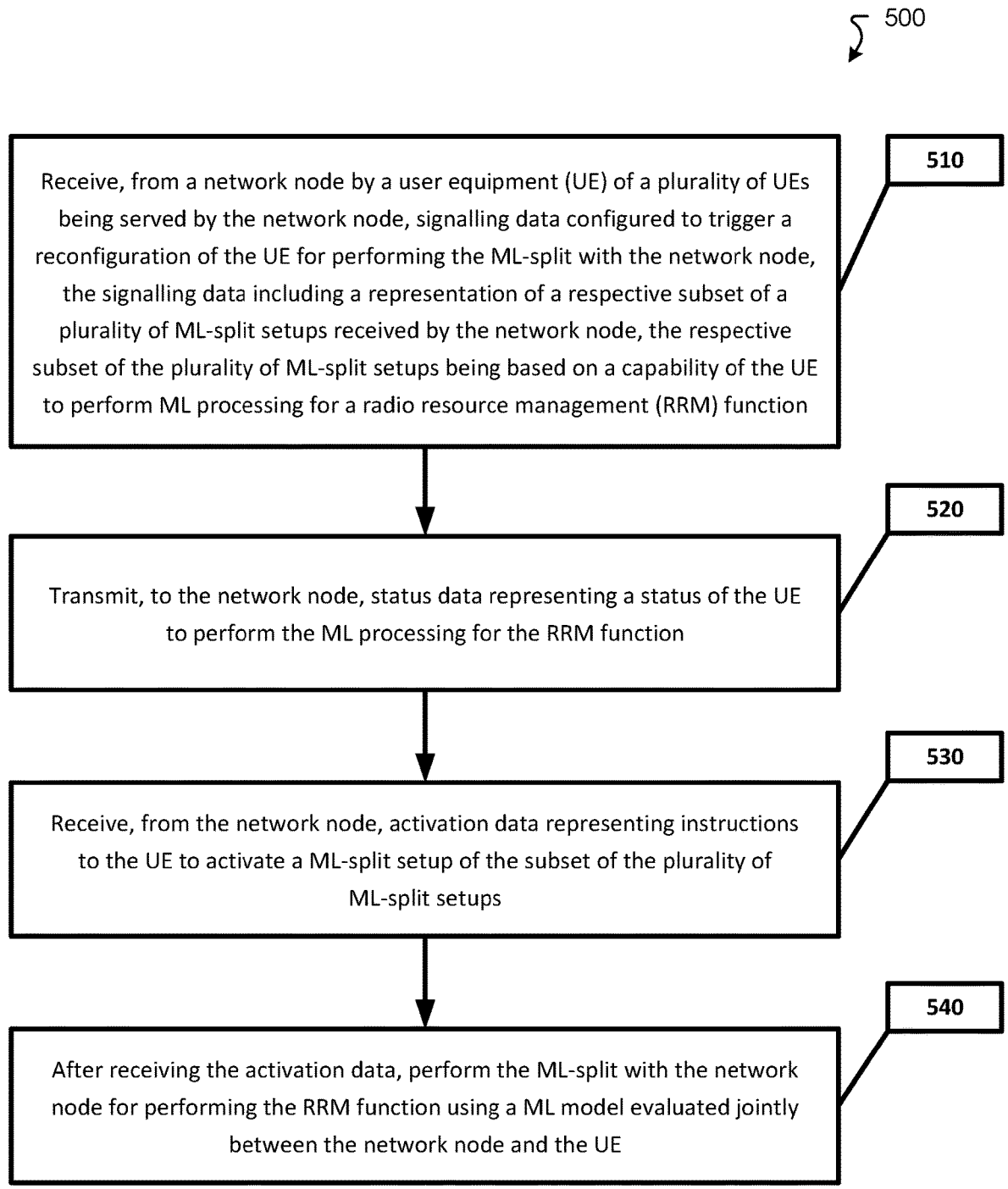
FIG. 5 is a flow chart illustrating a process of performing signalling support for ML-split assistance according to an example implementation.

Example 1-1: FIG. 5 is a flow chart illustrating an example method 500 of performing signalling support for ML-split assistance. Operation 510 includes receiving, within a wireless radio network, machine learning (ML)-split setup data representing a plurality of ML-split setups, an ML-split being a split of ML processing between the network node and that UE, each of the plurality of ML-split setups representing configuration options for a plurality of user equipments (UEs) being served by the network node so that the network node and each of the plurality of UEs may perform a radio resource management (RRM) function through a ML-split. Operation 520 includes transmitting, to each of the plurality of UEs being served by the network node, signalling data configured to trigger respective reconfigurations of each of the plurality of UEs for performing the ML-split with the network node, the signalling data including a representation of a respective subset of the plurality of ML-split setups, the respective subset of the plurality of ML-split setups being transmitted to that UE of the plurality of UEs based on a capability of that UE to perform ML processing for the RRM function.

Example 1-2: According to an example implementation of Example 1-1, wherein the signalling data includes reconfiguration signalling data transmitted over a radio resource control (RRC) signal employing at least one of a signalling radio bearer or a data radio bearer; and wherein the method further comprises receiving, from a UE of the plurality of UEs, status data representing a status of the UE to perform the ML processing for the RRM function.

Example 1-3: According to an example implementation of any of Examples 1-2 or 1-3, wherein the ML-split setup data is received from one of a ML-split orchestrator (MSO) or a gNB; and wherein the method further comprises transmitting, to the UE, activation data representing instructions to the UE to activate a ML-split setup of the subset of the plurality of ML-setups; and, after transmitting the activation data to the UE, performing the ML-split with the UE for performing the RRM function using a ML model evaluated jointly between the network node and the UE.

Example 1-4: According to an example implementation of Example 1-3, wherein the MSO is operated by a core network (CN) in which the network node and the plurality of UEs being served by the network node are included.

Example 1-5: According to an example implementation of Examples 1-1 to 1-4, wherein the plurality of ML-split setups are based on an RRM configuration with validity scope of at least one of a tracking area, a frequency layer, a beam identifier, or a geographical area.

Example 1-6: According to an example implementation of Examples 1-1 to 1-5, wherein the network node includes a node-B (gNB).

Example 1-7: According to an example implementation of Example 1-6, wherein the respective reconfigurations of each of the plurality of UEs for performing the ML-split with the network node are specific to a distributed unit (DU) of a gNB-central unit (CU).

Example 1-8: According to an example implementation of Examples 1-1 to 1-7, wherein the respective reconfigurations of each of the plurality of UEs for performing the ML-split with the network node are based on UE radio beam configuration, serving cells of the UE, UE ML capabilities, or quality of service (QoS) profile of the UE.

Example 1-9: According to an example implementation of Examples 1-1 to 1-8, wherein the respective reconfigurations of each of the plurality of UEs for performing the ML-split with the network node include an associated priority indicator for the RRM function.

Example 1-10: According to an example implementation of any of Examples 1-1 to 1-9, wherein the activation data is transmitted via a media access control (MAC) control element (CE).

Example 1-11: According to an example implementation of Example 1-10, wherein the activation data, when transmitted via the MAC CE, is configured to distinguish between a semi-persistent mode in which UE ML assistance is provided as per an established periodicity during the activation of the ML-setup, and a persistent mode in which the joint evaluation of the ML model is constantly employed during the activation of the ML-split setup.

Example 1-12: According to an example implementation of any of Examples 1-1 to 1-11, wherein the activation data is transmitted via downlink control information (DCI) signalling.

Example 1-13: According to an example implementation of any of Examples 1-1 to 1-12, wherein the activation data, when transmitted via the DCI signalling, is configured to distinguish between an aperiodic mode in which the wireless radio network is configured to transmit a request for ML assistance for a specific instance, a semi-persistent mode in which UE ML assistance is provided as per an established periodicity during the activation of the ML-split setup, and a persistent mode in which the joint evaluation of the ML model is constantly employed during the activation of the ML-split setup.

Example 1-14: According to an example implementation of Examples 1-1 to 1-13, wherein the method further comprises receiving deactivation data from a UE of the plurality of UEs being served by the network node; and in response to receiving the deactivation data, transmitting a ML-split deactivation status to a ML-split orchestrator (MSO).

Example 1-15: An apparatus comprising means for performing a method of any of Examples 1-1 to 1-14.

Example 1-16: A computer program product including a non-transitory computer-readable storage medium and storing executable code that, when executed by at least one data processing apparatus, is configured to cause the at least one data processing apparatus to perform a method of any of Examples 1-1 to 1-14.

Figure 6:
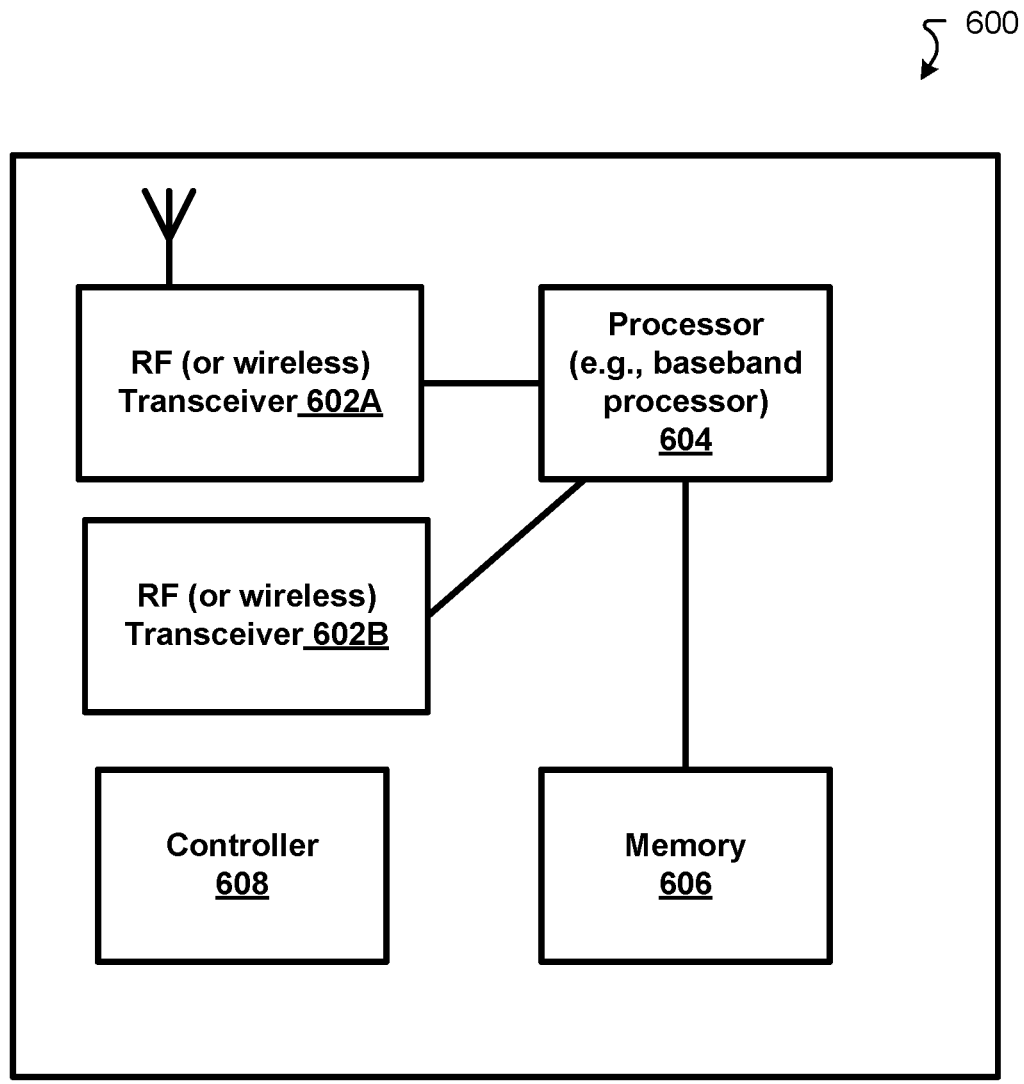
FIG. 6 is a block diagram of a node or wireless station (e.g., base station/access point, relay node, or mobile station/user device) according to an example implementation.

Example 2-1: FIG. 6 is a flow chart illustrating a process of performing signalling support for ML-split assistance. Operation 610 includes receiving, from a network node by a user equipment (UE) of a plurality of UEs being served by the network node, signalling data configured to trigger a reconfiguration of the UE for performing the ML-split with the network node, the signalling data including a representation of a respective subset of a plurality of ML-split setups received by the network node, the respective subset of the plurality of ML-split setups being based on a capability of the UE to perform ML processing for a radio resource management (RRM) function. Operation 620 includes transmitting, to the network node, status data representing a status of the UE to perform the ML processing for the RRM function. Operation 630 includes receiving, from the network node, activation data representing instructions to the UE to activate a ML-split setup of the subset of the plurality of ML-split setups. Operation 640 includes, after receiving the activation data, perform the ML-split with the network node for performing the RRM function using a ML model evaluated jointly between the network node and the UE.

Example 2-2: An apparatus comprising means for performing a method of Example 2-1.

Example 2-3: A computer program product including a non-transitory computer-readable storage medium and storing executable code that, when executed by at least one data processing apparatus, is configured to cause the at least one data processing apparatus to perform a method of Example 2-1.

LIST OF EXAMPLE ABBREVIATIONS

5GC 5G Core
AI Artificial Intelligence
NWDAF Network Data Analytics Function
CN Core Network
DCI Downlink Control Indicator
gNB 5G NR Node B
KPI Key Performance Indicator
MAC Medium Access Control
MAC CE MAC Control Element
ML Machine Learning
MSO ML-split orchestrator
QoS Quality of Service
RAN Radio Access Network
RRC Radio Resource Control
SDAP Service Data Adaptation Protocol
TA Tracking Area
UE User Equipment
UPF User Plane Function FIG. 7 is a block diagram of a wireless station (e.g., AP, BS, e/gNB, NB-IoT UE, UE or user device) 700 according to an example implementation. The wireless station 700 may include, for example, one or multiple RF (radio frequency) or wireless transceivers 702A, 702B, where each wireless transceiver includes a transmitter to transmit signals (or data) and a receiver to receive signals (or data). The wireless station also includes a processor or control unit/entity (controller) 704 to execute instructions or software and control transmission and receptions of signals, and a memory 706 to store data and/or instructions.

Processor 704 may also make decisions or determinations, generate slots, subframes, packets or messages for transmission, decode received slots, subframes, packets or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7 such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (TOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A user equipment (UE) comprising:
at least one processor; and
at least one memory including computer program code; the at least one memory and the computer program code configured to cause the apparatus at least to:
  receive, from a network node, radio resource control (RRC) reconfiguration signalling delivered on a signalling radio bearer (SRB) by the UE of a plurality of UEs being served by the network node, the signalling data configured to trigger a reconfiguration of the UE for performing the machine learning (ML)-split with the network node, the signalling data including a representation of a respective subset of a plurality of ML-split setups received by the network node, the respective subset being specific to a distributed unit (DU) of a next generation Node B (gNB) and including (i) per-radio resource management (RRM) priority indicators, (ii) an activation condition comprising at least a serving-cell reference signal received power (RSRP) threshold, and (iii) a field identifying whether activation will be signalled via a medium access control (MAC) control element (CE) or downlink control information (DCI), the subset being selected based on advertised ML processing capability of the UE together with at least one of the UE's radio beam configuration, serving cells, or quality of service (QOS) profile;
  transmit, to the network node, RRC status data representing a positive or negative readiness of the UE to perform the ML processing for the RRM function, wherein the readiness is dependent on whether the UE requires retraining of ML layers or is constrained by power consumption or traffic conditions;
  receive, from the network node, activation data representing instructions to the UE to activate an ML-split setup of the subset of the plurality of ML-split setups, the activation data being delivered via MAC CE or DCI signalling and distinguishing among aperiodic, semi-persistent, or persistent modes of ML assistance; and
  after receiving the activation data, perform the ML-split with the network node for performing the RRM function using an ML model evaluated jointly between the network node and the UE, wherein the UE executes local ML inference for component-carrier (CC) channel state information (CSI) feedback selection and transmits a prioritized CSI report constrained by uplink control information (UCI) payload limits as specified in 3GPP Technical Specification 38.214.

2. The user equipment (UE) of claim 1, wherein the RRC reconfiguration signalling further specifies a deactivation condition comprising: (i) the serving-cell reference signal received power (RSRP) falling below a threshold, and (ii) an explicit deactivation command from the gNB delivered via MAC control element (CE) or downlink control information (DCI).

3. The UE of claim 2, wherein the RRC status data comprises an indication that the UE is unable to activate the ML-split setup due to exceeding a thermal threshold or experiencing a shortage of processing resources.

4. The UE of claim 3, wherein the activation data received via the MAC CE distinguishes between semi-persistent ML assistance provided at a configured periodicity and persistent ML assistance assumed to be continuously employed during an activation period.

5. The UE of claim 3, wherein the activation data received via the DCI distinguishes among aperiodic ML assistance requested for a specific instance, semi-persistent ML assistance provided at a configured periodicity, and persistent ML assistance assumed to be continuously employed during an activation period.

6. The UE of claim 5, wherein the prioritized CSI report transmitted by the UE is generated by selecting, based on a trained ML model, a subset of component carrier (CC) channel state information (CSI) measurements to fit within an uplink control information (UCI) payload limit of 115 bits.

7. The UE of claim 6, wherein the ML inference executed by the UE for CC CSI feedback selection employs a hybrid approach combining ML-based inference with rule-based physical (PHY) or medium access control (MAC) layer procedures.

8. A system comprising:
a user equipment (UE):
at least one processor; and
at least one memory including computer program code; the at least one memory and the computer program code configured to cause the apparatus at least to:
  receive, from a network node, radio resource control (RRC) reconfiguration signalling delivered on a signalling radio bearer (SRB) by the UE of a plurality of UEs being served by the network node, the signalling data configured to trigger a reconfiguration of the UE for performing the machine learning (ML)-split with the network node, the signalling data including a representation of a respective subset of a plurality of ML-split setups received by the network node, the respective subset being specific to a distributed unit (DU) of a next generation Node B (gNB) and including (i) per-radio resource management (RRM) priority indicators, (ii) an activation condition comprising at least a serving-cell reference signal received power (RSRP) threshold, and (iii) a field identifying whether activation will be signalled via a medium access control (MAC) control element (CE) or downlink control information (DCI), the subset being selected based on advertised ML processing capability of the UE together with at least one of the UE's radio beam configuration, serving cells, or quality of service (QOS) profile;
  transmit, to the network node, RRC status data representing a positive or negative readiness of the UE to perform the ML processing for the RRM function, wherein the readiness is dependent on whether the UE requires retraining of ML layers or is constrained by power consumption or traffic conditions;
  receive, from the network node, activation data representing instructions to the UE to activate an ML-split setup of the subset of the plurality of ML-split setups, the activation data being delivered via MAC CE or DCI signalling and distinguishing among aperiodic, semi-persistent, or persistent modes of ML assistance; and
  after receiving the activation data, perform the ML-split with the network node for performing the RRM function using an ML model evaluated jointly between the network node and the UE, wherein the UE executes local ML inference for component-carrier (CC) channel state information (CSI) feedback selection and transmits a prioritized CSI report constrained by uplink control information (UCI) payload limits as specified in 3GPP Technical Specification 38.214.

9. The system of claim 8, wherein the RRC reconfiguration signalling further specifies a deactivation condition comprising the following: (i) the serving-cell reference signal received power (RSRP) falling below a threshold, and (ii) an explicit deactivation command from the gNB delivered via MAC control element (CE) or downlink control information (DCI).

10. The system of claim 9, wherein the RRC status data comprises an indication that the UE is unable to activate the ML-split setup due to exceeding a thermal threshold or experiencing a shortage of processing resources.

11. The system of claim 10, wherein the activation data received via the MAC CE distinguishes between semi-persistent ML assistance provided at a configured periodicity and persistent ML assistance assumed to be continuously employed during an activation period.

12. The system of claim 10, wherein the activation data received via the DCI distinguishes among aperiodic ML assistance requested for a specific instance, semi-persistent ML assistance provided at a configured periodicity, and persistent ML assistance assumed to be continuously employed during an activation period.

13. The system of claim 11, wherein the prioritized CSI report transmitted by the UE is generated by selecting, based on a trained ML model, a subset of component carrier (CC) channel state information (CSI) measurements to fit within an uplink control information (UCI) payload limit of 115 bits.

14. The system of claim 13, wherein the ML inference executed by the UE for CC CSI feedback selection employs a hybrid approach combining ML-based inference with rule-based physical (PHY) or medium access control (MAC) layer procedures.

15. A method performed by a user equipment (UE), the method comprising:
  receiving, from a network node, radio resource control (RRC) reconfiguration signalling delivered on a signalling radio bearer (SRB) by the UE of a plurality of UEs being served by the network node, the signalling data configured to trigger a reconfiguration of the UE for performing a machine learning (ML)-split with the network node, the signalling data including a representation of a respective subset of a plurality of ML-split setups received by the network node, the respective subset being specific to a distributed unit (DU) of a next generation Node B (gNB) and including (i) per-radio resource management (RRM) priority indicators, (ii) an activation condition comprising at least a serving-cell reference signal received power (RSRP) threshold, and (iii) a field identifying whether activation will be signalled via a medium access control (MAC) control element (CE) or downlink control information (DCI), the subset being selected based on advertised ML processing capability of the UE together with at least one of the UE's radio beam configuration, serving cells, or quality of service (QOS) profile;
  transmitting, to the network node, RRC status data representing a positive or negative readiness of the UE to perform the ML processing for the RRM function, wherein the readiness is dependent on whether the UE requires retraining of ML layers or is constrained by power consumption or traffic conditions;
  receiving, from the network node, activation data representing instructions to the UE to activate an ML-split setup of the subset of the plurality of ML-split setups, the activation data being delivered via MAC CE or DCI signalling and distinguishing among aperiodic, semi-persistent, or persistent modes of ML assistance; and
  after receiving the activation data, performing the ML-split with the network node for performing the RRM function using an ML model evaluated jointly between the network node and the UE, wherein the UE executes local ML inference for component-carrier (CC) channel state information (CSI) feedback selection and transmits a prioritized CSI report constrained by uplink control information (UCI) payload limits as specified in 3GPP Technical Specification 38.214.

16. The method of claim 15, further comprising receiving, in the RRC reconfiguration signalling, a deactivation condition comprising at least one of: (i) the serving-cell RSRP falling below a threshold, or (ii) an explicit deactivation command from the gNB delivered via MAC CE or DCI.

17. The method of claim 16, wherein transmitting the RRC status data comprises transmitting an indication that the UE is unable to activate the ML-split setup due to exceeding a thermal threshold or experiencing a shortage of processing resources.

18. The method of claim 17, wherein the activation data received via the MAC CE distinguishes between semi-persistent ML assistance provided at a configured periodicity and persistent ML assistance assumed to be continuously employed during an activation period.

19. The method of claim 18, wherein transmitting the prioritized CSI report comprises selecting, based on a trained ML model, a subset of CC CSI measurements to fit within an uplink control information (UCI) payload limit of 115 bits.

20. The method of claim 19, wherein performing the ML inference for CC CSI feedback selection comprises employing a hybrid approach that combines ML-based inference with rule-based physical (PHY) or medium access control (MAC) layer procedures.

* * * * *